United States Patent [19]

Iwasaki

[11] Patent Number: 5,363,415
[45] Date of Patent: Nov. 8, 1994

[54] CARRIER REGENERATING DEVICE CORRECTLY OPERABLE IN MOBILE SATELLITE COMMUNICATION

[75] Inventor: Motoya Iwasaki, Tokyo, Japan
[73] Assignee: NEC Corporation, Japan
[21] Appl. No.: 19,142
[22] Filed: Feb. 17, 1993
[30] Foreign Application Priority Data

Feb. 17, 1992 [JP] Japan .................................. 4-029543

[51] Int. Cl.[5] .......................................... H04L 27/06
[52] U.S. Cl. ........................................ 375/97; 375/86;
329/304; 455/215; 455/306
[58] Field of Search .................. 375/39, 83, 86, 97,
375/114, 116; 329/300, 302, 304, 306; 455/215,
303, 306

[56] References Cited

U.S. PATENT DOCUMENTS

| 4,514,855 | 4/1985 | Lang et al. | 375/97 |
| 5,012,491 | 4/1991 | Iwasaki | 375/97 |
| 5,148,451 | 9/1992 | Otani et al. | 375/97 |
| 5,276,710 | 1/1994 | Iwasaki | 375/97 |

FOREIGN PATENT DOCUMENTS

0427283  5/1991  European Pat. Off. .

*Primary Examiner*—Stephen Chin
*Assistant Examiner*—Young Tse
*Attorney, Agent, or Firm*—Ostrolenk, Faber, Gerb & Soffen

[57] ABSTRACT

Supplied with an input signal into which a carrier signal is modulated at a frame period by a data signal and unique words periodically interspersed throughout the data signal, a demodulating circuit (14) demodulates the input signal into a demodulated signal. A frame synchronizing circuit (23) produces an aperture signal which defines an aperture interval determined by the frame period when the demodulated signal has a level which is lower than a predetermined threshold level. Responsive to the aperture signal, a cross-correlating circuit (24) calculates a cross-correlation coefficient between the demodulated signal and a locally known unique word. By the use of the cross-correlation coefficient, a phase error calculating circuit (25) calculates a phase error between a reproduced carrier signal reproduced from the demodulated signal and a regenerated carrier signal which is a correct regeneration of the carrier signal. By the use of the cross-correlation coefficient and the demodulated signal, a frequency error calculating section (31-35) calculates a frequency error between the reproduced carrier signal and the regenerated carrier signal. A carrier regenerating circuit (15) makes the reproduced carrier signal become the regenerated carrier signal in accordance with the phase error and the frequency error.

4 Claims, 2 Drawing Sheets

CARRIER REGENERATING DEVICE CORRECTLY OPERABLE IN MOBILE SATELLITE COMMUNICATION

BACKGROUND OF THE INVENTION

This invention relates to a carrier regenerating device for use in a mobile station of a mobile satellite communication network.

In mobile satellite communication, a modulated signal is transmitted from a master station to mobile stations and from each mobile station to the master station. The modulated signal is derived by modulating a carrier signal at a frame period by a data signal representative of a message and by unique words which are periodically interspersed in the data signal. Therefore, the modulated signal comprises a modulated data signal and modulated unique words and will herein be called a modulated overall signal. The unique words are preliminarily known at the mobile stations. Such a unique word will herein be called a locally known unique word.

In order to get primarily the message, each mobile station comprises a carrier regenerating device for regenerating the carrier signal as a regenerated carrier signal from the modulated overall signal received at the mobile station as an input modulated signal having the frame period and comprising the modulated data signal and the modulated unique words which are periodically interspersed in the modulated data signal.

A conventional carrier regenerating device comprises a demodulating circuit for quadrature demodulating the input modulated signal into a demodulated overall signal by the use of the regenerated carrier signal. The demodulated overall signal comprises a demodulated data signal representative of the message and demodulated unique words. The conventional regenerating device further comprises a carrier reproducing or regenerating circuit for regenerating the regenerating carrier signal from the demodulated overall signal.

The conventional carrier regenerating device operates well as 10 dg as the input modulated signal supplied thereto is steadily above a predetermined signal to noise (S/N) ratio. However, the carrier regenerating device may not always be supplied with the input modulated signal above the predetermined signal to noise ratio. For example, as the mobile station is moved from ode location to another it may fall within the shadowed buildings and trees depending on the location. In a worst case, the carrier regenerating device can not receive the input modulated signal at all. In such an event, the carrier regenerating circuit is placed in a free running state. The regenerated carrier signal steps out of frame synchronism, namely, out of synchronism with the frame period. As a result, a phase shift occurs in the regenerated carrier signal. In addition, a frequency shift appears in the regenerated carrier signal. Even when the mobile station moves to a location where the carrier regenerating device can receive the input modulated signal above the predetermined signal to noise ratio, it takes a long recovery time for the carrier regenerating circuit to regenerate the regenerated carrier signal again in synchronism with the frame period.

In order to regenerate the regenerated carrier signal in a short recovery time, an improved carrier regenerating device is disclosed in the European Patent No. 0427283A4. The improved carrier regenerating device comprises the above-mentioned demodulating and the carrier regenerating circuits. The improved carrier regenerating device further comprises a frame synchronizing circuit for producing an aperture signal by the use of the demodulated overall signal when the demodulated overall signal has a level which is lower than a predetermined threshold level. The aperture signal defines aperture intervals determined on the basis of the frame period. Responsive to the aperture signal, a cross correlating circuit calculates a cross-correlation coefficient between the demodulated overall signal and the locally known unique word. The phase shift is detected as a phase error in accordance with the cross-correlation coefficient in a phase error detector. In addition, the frequency shift is calculated as a frequency error in accordance with the phase error in a frequency error calculator.

When the frequency shift is larger than a predetermined shift value on receiving the input modulated signal again at the carrier regenerating device, the frequency error calculator can not calculate the frequency error. As a result, it is impossible for the carrier regenerating device to regenerate the regenerated carrier signal again in synchronism with the frame period.

SUMMARY OF THE INVENTION

It is therefore an object of this invention to provide a carrier regenerating device capable of regenerating a regenerated carrier signal in synchronism with a frame period when a frequency shift is larger than a predetermined shift value.

It is another object of this invention to provide a carrier regenerating device capable of quickly regenerating a regenerated carrier signal in synchronism with a frame period.

On describing the gist of this invention, it is possible to understand that a carrier regenerating device is for regenerating a regenerated carrier signal from a modulated overall signal having a frame period and comprising a modulated data signal and modulated unique words which are periodically interspersed in said modulated signal and comprises: (a) demodulating means for quadrature demodulating, by the use of the regenerated carrier signal, the modulated overall signal to produce a demodulated overall signal comprising a demodulated data signal and demodulated unique words and (b) carrier reproducing means for reproducing a reproduced carrier signal from the demodulated overall signal.

According to this invention, the above-understood carrier regenerating device comprises (1) producing means for producing, by the use of the demodulated overall signal, an aperture signal which defines aperture intervals determined on the basis of the frame period when the demodulated overall signal has a level which is lower than a predetermined threshold level, (2) cross-correlating means responsive to the aperture signal for calculating a cross-correlation coefficient between the demodulated overall signal and a locally known unique word, (3) phase error calculating means for calculating, by the use of the cross-correlation coefficient, a phase error which the reproduced carrier signal has relative to the regenerated carrier signal, (4) frequency error calculating means for calculating, by the use of the cross-correlation coefficient and the demodulated overall signal, a frequency error which the reproduced carrier signal has relative to the regenerated carrier signal, (5) first correction setting means for setting the phase error at the aperture intervals in the carrier regenerating circuit to make the reproduced carrier signal become the regenerated carrier signal, and (6) second correction setting means for setting the frequency error at the aperture intervals in the carrier regenerating circuit to make the reproduced carrier signal become the regenerated carrier signal.

DESCRIPTION OF THE PREFERRED EMBODIMENT

Figure 1:
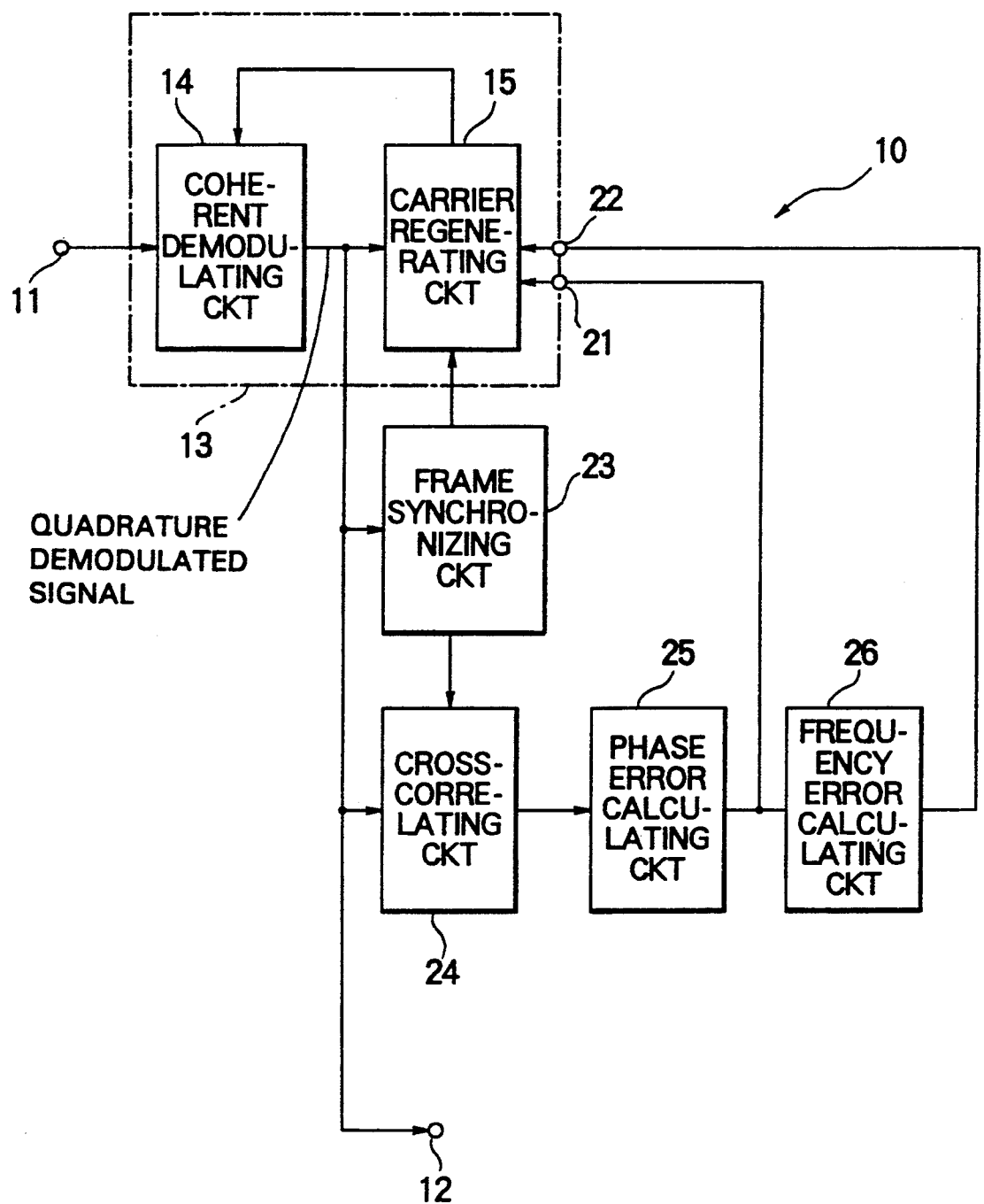
FIG. 1 is a block diagram of a conventional carrier regenerating device.

Referring to FIG. 1, description will first be made as regards a conventional carrier regenerating device 10 for a better understanding of this invention. The carrier regenerating device 10 is for use in a mobile station of a mobile satellite communication network which includes a master station for such mobile stations. It will be assumed that a carrier signal is subjected to modulation at the master station and with a frame period into a modulated signal by a data signal representative of a message and that unique words are periodically interspersed at the frame period throughout the data signal. The unique words are known at the mobile stations. Such a unique word is therefore referred to herein as a locally known unique word.

Inasmuch as the carrier signal is modulated at the master station by the data signal or by the locally known unique word, the modulated signal comprises a modulated data signal and modulated unique words and is herein called a modulated overall signal. The mobile station has a demodulator input and output terminals 11 and 12. Through a receiving unit which is usual in the mobile station, and is therefore not shown, the demodulator input terminal 11 is supplied with the modulated overall signal as an input modulated signal.

The carrier regenerating device is for regenerating the carrier signal from the input modulated signal as a regenerated carrier signal in the manner which will become clear as the description proceeds. A demodulator unit 13 is supplied with the input modulated signal through the demodulator input terminal 11 and is for demodulating the input modulated signal into an output demodulated signal which comprises a demodulated data signal and demodulated unique words. The output demodulated signal is delivered to the demodulator input terminal 12.

The demodulating unit 13 comprises a coherent demodulating circuit 14 and a carrier regenerating circuit 15. The coherent demodulating circuit 14 is supplied with the input modulated signal from the demodulator input terminal 11 and with the regenerated carrier signal. The coherent demodulating circuit 14 produces the output demodulated signal in the manner known in the art. The output demodulated signal is delivered not only to the demodulator output terminal 12 but also to the carrier regenerating circuit 15. The carrier regenerating circuit 15 supplies a reproduced carrier signal to the coherent demodulating circuit 14.

As long as the input modulated signal is supplied to the demodulator input terminal 11 at a level above a predetermined signal to noise (S/N) ratio, the reproduced carrier signal is correctly coincident with the regenerated carrier signal. When the input modulated signal has a severely attenuated level, the carrier regenerating circuit 15 is placed in a free running state. In this event, the reproduced carrier signal may step out of frame synchronism; that is, out of synchronism with the frame period. As a result, the reproduced carrier signal is undesiredly given a phase error and a frequency error relative to the regenerated carrier signal.

In order to make the carrier regenerating circuit 15 correctly produce the regenerated carrier signal, quadrature demodulation is used in the coherent demodulating circuit 14. The output demodulated signal therefore becomes a quadrature demodulated signal which is a complex-valued signal and can be represented by real and imaginary signal components.

The demodulating unit 13 has first and second control terminals 21 and 22. A frame synchronizing circuit 23 is supplied from the coherent demodulating circuit 14 with the output demodulated signal. The frame synchronizing circuit 23 compares a level of the output demodulated signal with a predetermined threshold level. When the level of the output demodulated signal is lower than the predetermined threshold level, i.e., when the frame synchronism is not established, the frame synchronizing circuit 23 produces an aperture signal that is synchronized with the locally known unique word and that defines an aperture interval determined on the basis of the frame period. The aperture signal is supplied from the frame synchronizing circuit 23 to a cross-correlating circuit 24. When the level of the output demodulated signal is not lower than the predetermined threshold level, i.e., when the frame synchronism is established, the frame synchronizing circuit 23 does not produce the aperture signal.

As a result, the cross-correlating circuit 24 is given the output demodulated signal together with the aperture signal. The cross-correlating circuit 24 extracts the demodulated unique words from the demodulated data sequence and calculates a cross-correlation between the demodulated unique words and the locally known unique word. The cross-correlating circuit 24 thereby produces a cross-correlation signal which typically represents the cross-correlation coefficient and which may become large as the above-mentioned cross-correlation becomes strong. In other words, the cross-correlation signal has a magnitude which depends upon a phase error between the demodulated unique words and the locally known unique word. At any rate, the cross-correlation signal is delivered from the cross-correlating circuit 24 to a phase error calculating circuit 25.

Supplied with the cross-correlation signal, the phase error calculating circuit 25 calculates a phase error which the reproduced carrier signal has relative to the regenerated carrier signal and which may be specified by the cross-correlation signal. The phase error calculating circuit 25 produces a phase error signal which represents the phase error and which is supplied to both the first control terminal 21 and a frequency error calculating circuit 26. As a result, the phase error is set in the carrier regenerating circuit 15.

Responsive to the phase error signal, the frequency error calculating circuit 26 calculates a frequency error between the reproduced carrier signal and the regenerated carrier signal. The frequency error calculating circuit 26 thereby produces a frequency error signal which represents the frequency error and which is supplied to the second control terminal 22. As a result, the frequency error is set in the carrier regenerating circuit 15.

The carrier regenerating circuit 15 renders the reproduced carrier signal into a regenerated carrier signal in accordance with the phase error and the frequency error.

It may be mentioned here that the carrier regenerating circuit 15 produces the reproduced carrier signal with a carrier signal phase angle which may or may not be identical with a correct phase angle of the regenerated carrier signal. Using the cross-correlation signal, the phase error calculating circuit 25 calculates the correct phase angle and may therefore alternatively be called a phase calculating circuit.

Let the cross-correlation coefficient be equal to A0 during one or a first aperture interval and be represented by a complex value. In this event, a first phase angle $\theta_0$ is given in connection with the cross-correlation by:

$$\theta_0 = \arctan(\operatorname{Im}(A_0)/\operatorname{Re}(A_0)), \quad (1)$$

where Re and Im represent real and imaginary signal components of the cross-correlation signal.

It will be assumed that the cross-correlation coefficient is equal to Ae during a next or a second aperture interval and a second phase angle $\theta e$ is also calculated by Equation (1).

In this event, the frequency error $\omega e$ is given by:

$$\omega e = (\theta e - \theta_0)/T, \quad (2)$$

where T represents the aperture interval.

Herein, let the frequency error $\omega e$ be calculated on the assumption that the input modulated signal has a first carrier frequency before the input modulated signal is not received at all and has a second carrier frequency when the input modulated signal is again received. Furthermore, it will be assumed that a frequency difference between the first carrier frequency and the second carrier frequency is given by $\Delta\omega$. Under the circumstances, a phase difference or a phase error between the first phase angle $\theta_0$ and the second phase angle $\theta e$ is given with reference to Equation (2) by:

$$\theta e - \theta_0 = T\Delta\omega. \quad (3)$$

Inasmuch as the phase difference is greater than $-\pi$ and is not greater than $\pi$, the righthand side of Equation (3) may be equivalently rewritten into $T\Delta\omega \pm 2n\pi$ when the absolute value of $\Delta\omega$ is greater than $\pi/T$, where n represents a positive integer. Therefore, the frequency error $\omega e$ is given by:

$$\omega e = \Delta\omega \pm (2n\pi/T). \quad (4)$$

It is readily understood from Equation (4) that the frequency error calculating circuit 26 can not correctly calculate the frequency error.

Figure 2:
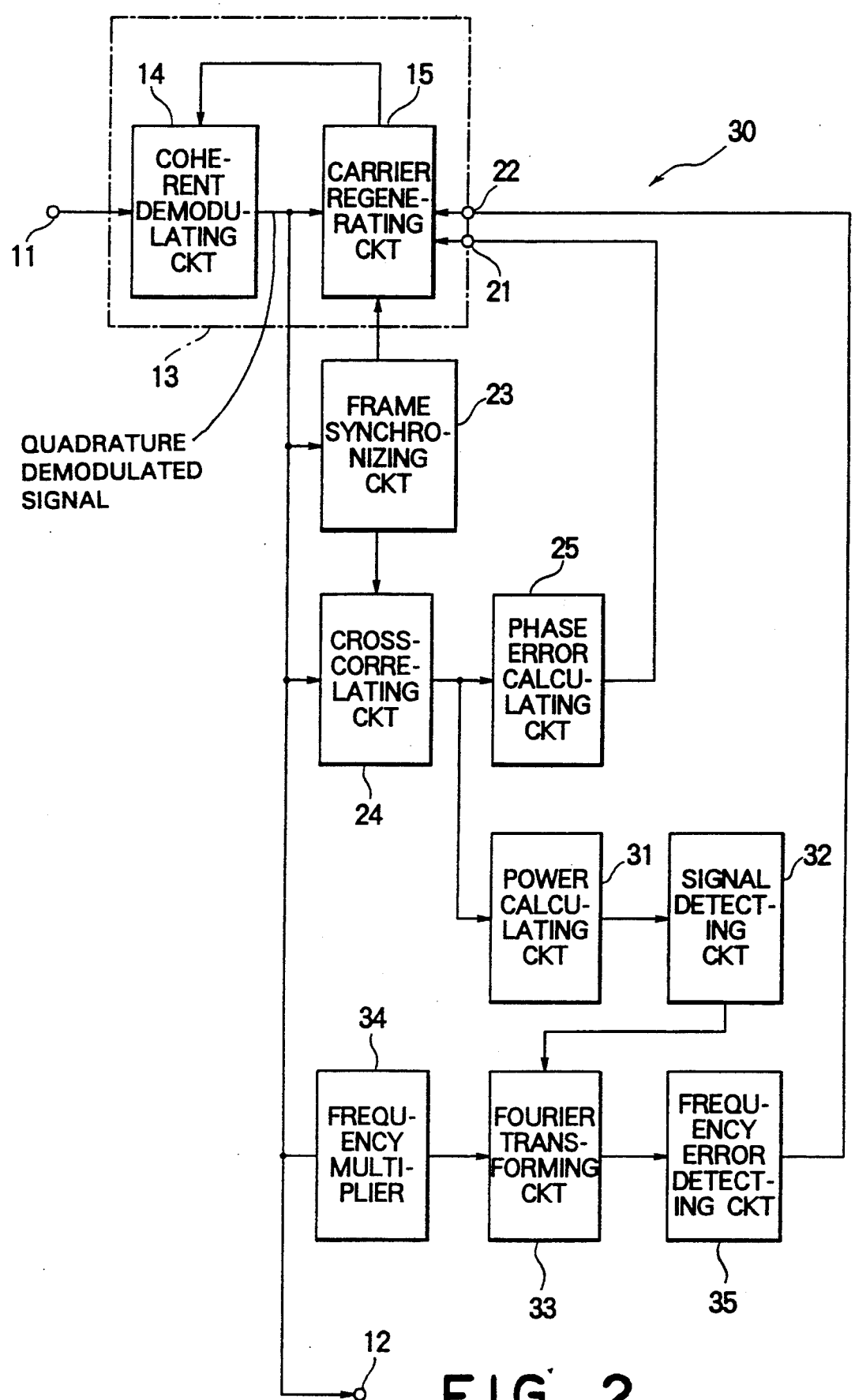
FIG. 2 is a block diagram of a carrier regenerating device according to a preferred embodiment of this invention.

Referring to FIG. 2, description will proceed to a carrier regenerating device according to a preferred embodiment of this invention. The illustrated carrier regenerating device is different from the carrier regenerating device 10 illustrated in FIG. 1 and is therefore designated afresh by a reference numeral 30. The carrier regenerating device 30 comprises similar parts which are designated by like reference numerals and operable with likewise named signals.

The master station transmits the modulated overall signal to the mobile station. The mobile station receives the modulated overall signal at the receiving unit. The modulated overall signal is supplied as the input modulated signal from the receiving unit to the demodulator input terminal 11. Let the modulated overall signal and the input modulated signal be represented by S(t) and R(t), respectively, each of which is a complex-valued function of time t. Using the modulated overall signal S(t), the input modulated signal R(t) is given:

$$R(t) = S(t)e^{j(\omega t + \theta)}, \quad (5)$$

where $\omega$ represents a frequency of the carrier signal and $\theta$ represents a phase angle.

Let the reproduced carrier signal and the output demodulated signal be represented by L(t) and D(t), respectively, each of which is a complex-valued signal of time t. Using the input modulated signal R(t) and the reproduced carrier signal L(t), the output demodulated signal D(t) is given by:

$$D(t) = R(t)L(t). \quad (6)$$

When the reproduced carrier signal is coincident with the regenerated signal, the reproduced carrier signal is given by:

$$L(t) = e^{-j(\omega t + \theta)}. \quad (7)$$

Therefore, the modulated overall signal is coincident with the output demodulated signal at the frequency $\omega$ and the phase angle $\theta$. Namely, the demodulating unit 13 can correctly produce the output demodulated signal.

As described above, the frame synchronizing circuit 23 produces the aperture signal when the frame synchronism is not established. In this event, the frame synchronizing circuit 23 supplies a control signal to the carrier regenerating circuit 15. Responsive to the control signal, the carrier regenerating circuit 15 produces the reproduced carrier signal which has a frequency of $\omega$.

As described above, the cross-correlating circuit 24 calculates the cross-correlation coefficient between the output demodulated signal and the locally known unique word.

Let the cross-correlation coefficient be represented by A(t) which is a complex-valued function of time t. The locally known unique word can be represented by U($\tau$) as a function of a parameter $\tau$ which has a dimension of time. The cross-correlation coefficient A(t) is given by:

$$A(t) = \int_0^{Tv} D(t + \tau)U^*(\tau)d\tau, \quad (8)$$

where $U^*(\tau)$ represents a conjugate function of the locally known unique word, Tv represents a unique word length.

Let the phase difference and the frequency difference be represented by $\Delta\theta$ and $\Delta\omega$, respectively. Equation (8) can be rewritten into Equation (9).

$$A(t) = \int_0^{Tv} U(\tau)e^{j(\Delta\omega\tau+\Delta\theta)}U^*(\tau)d\tau \quad (9)$$

$$= e^{j\Delta\theta}\int_0^{Tv} e^{j\Delta\omega\tau}d\tau.$$

When $\Delta\omega Tv$ is nearly equal to zero, the cross-correlation coefficient $A(t)$ is given by:

$$A(t) = Tve^{j\Delta\theta}. \quad (10)$$

The cross-correlation coefficient $A(t)$ is supplied to the phase error calculating circuit 25 and a power calculating circuit 31. As described above in conjunction with FIG. 1, the phase error calculating circuit 25 calculates in accordance with the cross-correlation coefficient the phase error which the reproduced carrier signal has relative to the regenerated carrier signal. It is readily understood from the Equation (10) that the phase error calculating circuit 25 produces the phase error which is represented by $\Delta\theta$. The phase error $\Delta\theta$ is supplied from the phase error calculating circuit 25 to the carrier regenerating circuit 15 through the first control terminal 21.

Supplied with the cross-correlation coefficient, the power calculating circuit 31 calculates a correlation power of the cross-correlation coefficient. As readily understood from the Equation (10), the power calculating circuit 31 produces the correlation power which is represented by $|Tv|^2$. The correlation power is supplied from the power calculating circuit 31 to a signal detecting circuit 32.

The signal detecting circuit 32 detects whether or not the correlation power is greater than a prescribed threshold value. When the correlation power is greater than the prescribed threshold value, the signal detecting circuit 32 supplies a detection signal to a Fourier transforming circuit 33.

Reviewing FIG. 2, the output demodulated signal is delivered from the coherent demodulating circuit 14 to a frequency multiplier 34 to be frequency multiplied into a frequency shifted signal. In the illustrated example, the input modulated signal may be, for example, an N-phase phase shift keying modulated signal, where N represents a predetermined number which is not less than two. The predetermined integer N is usually equal to $2^m$, where m represents a positive number. In this event, the frequency multiplier 34 frequency multiplies the output demodulated signal into the frequency shifted signal by the predetermined integer N.

Let the frequency shifted signal be represented by $M(t)$. The frequency shifted signal $M(t)$ is given by:

$$M(t) = \{D(t)\}^n = e^{jN\Delta\omega t} \quad (11)$$

The frequency shifted signal is supplied from the frequency multiplier 34 to the Fourier transforming circuit 33.

Responsive to the detection signal, the Fourier transforming circuit 33 Fourier transforms the frequency shifted signal into a Fourier transformed signal to supply the Fourier transformed signal to a frequency error detecting circuit 35.

As readily understood from the Equation (11), the Fourier transformed signal has a spectrum which has a peak level at a frequency of $N\Delta\omega$. Therefore, the frequency error detecting circuit 35 detects the peak level to obtain the frequency $N\Delta\omega$. The predetermined integer N is set in the frequency error detecting circuit 35. The frequency error detecting circuit 35 divides the frequency $N\Delta\omega$ by the predetermined integer N to produce $\Delta\omega$ as the frequency error. The frequency error $\Delta\omega$ is supplied from the frequency error detecting circuit 35 to the second control terminal 22. As described above, the phase error $\Delta\theta$ is supplied from the phase error calculating circuit 25 to the first control terminal 21.

Responsive to the phase error and the frequency error, the carrier regenerating circuit 15 make the reproduced carrier signal become the regenerated carrier signal in accordance with the phase error and the frequency error.

In conjunction with FIG. 2, the first control terminal 21 serves as a first correction setting arrangement for setting the phase error at the aperture interval in the carrier regenerating circuit 15. The second control terminal 22 serves as a second correction setting arrangement for setting frequency error at the aperture interval in the carrier regenerating circuit 15. Furthermore, the power calculating circuit 31, the signal detecting circuit 32, the Fourier transforming circuit 33, the frequency multiplier 34, and the frequency error calculating circuit 35 collectively serves as a frequency error calculating section for calculating the frequency error by the use of the cross-correlation coefficient and the output demodulated signal.

What is claimed is:

1. A carrier regenerating device for regenerating a regenerated carrier signal from a modulated overall signal having a frame period and comprising a modulated data signal and modulated unique words which are periodically interspersed in said modulated data signal, said carrier regenerating device comprising:

demodulating means for quadrature demodulating, by the use of said regenerated carrier signal, said modulated overall signal to produce a demodulated overall signal comprising a demodulated data signal and demodulated unique words;

carrier reproducing means for reproducing a reproduced carrier signal from said demodulated overall signa;

producing means for producing, by the sue of said demodulated overall signal, an aperture signal which defines an aperture interval determined on the basis of said frame period when said demodulated overall signal has a level which is lower than a predetermined threshold level;

cross-correlating means responsive to said aperture signal for calculating a cross-correlation coefficient between said demodulated overall signal and a locally known unique word;

phase error calculating means for calculating, by the use of said cross-correlation coefficient, a phase error which said reproduced carrier signal has relative to said regenerated carrier signal;

frequency error calculating means for calculating, by the use of said cross-correlation coefficient and said demodulated overall signal, a frequency error which said reproduced carrier signal has relative to said regenerated carrier signal;

first correction applying means for applying said phase error at said aperture interval to said carrier reproducing means; and second correction applying means for applying said frequency error at said aperture interval to said carrier reproducing means;

said carrier reproducing means responding to said phase error to make said reproduced carrier signal become said regenerated carrier signal and responding to said frequency error to make said reproduced carried signal become said regenerated carrier signal.

2. The carrier regenerating device as claimed in claim 1, wherein said frequency error calculating means comprises:

level detecting means for detecting whether or not said cross-correlation coefficient has a value which is greater than a prescribed threshold value, said level detecting means producing a detection signal when the value of said cross-correlation coefficient is greater than said prescribed threshold value; and frequency error producing means responsive to said detection signal for producing said frequency error in accordance with said demodulated overall signal.

3. The carrier regenerating device as claimed in claim 2, wherein said level detecting means comprises:

power calculating means for calculating a power of said cross-correlation coefficient to produce a power value signal representative of a power level of said cross-correlation coefficient; and power value detecting means for detecting whether or not said power value signal has a power value which is greater than a prescribed threshold value, said power value detecting means producing said detection signal when the power value of said power value signal is greater than said prescribed threshold value.

4. The carrier regenerating device as claimed in claim 2, said modulated overall signal being N-phase phase shift keying modulated signal, where N represents a predetermined integer which is not less than two, wherein said frequency error producing means comprises:

a frequency multiplier for frequency multiplying said demodulated overall signal into a frequency shifted signal by said predetermined integer N;

a Fourier transforming circuit responsive to said detection signal for Fourier transforming said frequency shifted signal into a Fourier transformed signal; and a frequency error detecting circuit for detecting a peak level of said Fourier transformed signal to produce said frequency error.

* * * * *